Jan. 26, 1926. 1,570,968
O. M. MARTIN
CULTIVATOR
Filed Feb. 25, 1925
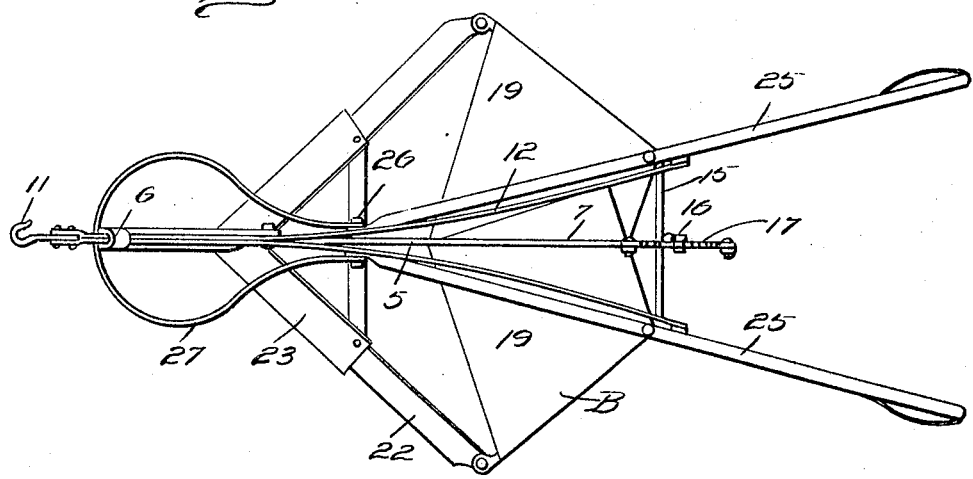
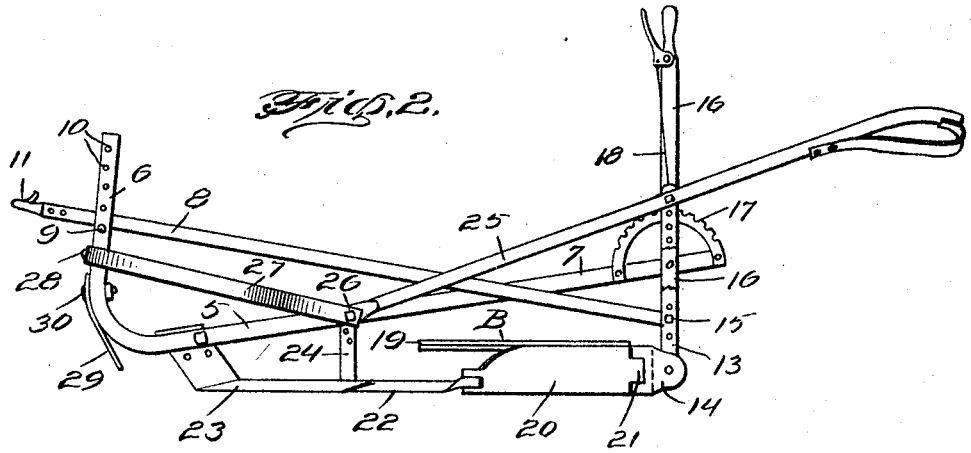
Inventor
O. M. Martin.
By Clarence O'Brien
Attorney Patented Jan. 26, 1926.

1,570,963

UNITED STATES PATENT OFFICE.

OLLIE M. MARTIN, OF BLOOMINGTON, INDIANA.

CULTIVATOR.

Application filed February 25, 1925. Serial No. 11,460.

*To all whom it may concern:*

Be it known that I, OLLIE M. MARTIN, a citizen of the United States, residing at Bloomington, in the county of Monroe and State of Indiana, have invented certain new and useful Improvements in a Cultivator, of which the following is a specification.

The present invention relates to a cultivator and has for its principal object to provide an improved implement of this nature which will produce and lay a mulch of finely pulverized earth on the surface of a field over which it is passed.

Another important object of this invention is to provide an implement which will cultivate the whole width for which it is set to an even depth.

Another important object of the invention is to provide an improved implement of this nature which will cut off weeds, briers, and small shrubs at a depth sufficient to discourage renewal growth.

A still further object of the invention is to generally improve upon cultivators of this nature by providing a simple and efficient structure, one which is reliable in use, inexpensive to manufacture, strong, durable, not liable to readily get out of order, easy to adjust, convenient to manipulate, and otherwise well adapted to the purpose for which it is designed.

With the foregoing and numerous other objects in view as will appear as the description proceeds, the invention resides in certain novel features of construction, and in the combination and arrangement of parts as will be hereinafter more fully described and claimed.

In the drawings—

Figure 1 is a top plan view of the cultivator, and

Fig. 2 is a side elevation thereof.

Referring to the drawing in detail, it will be seen that the numerals 5 designate the main stem of the device which is bent over upon itself intermediate its ends so as to form a channel retainer 6 extending vertically and merging into the rearwardly and longitudinally extending beam members 7.

A draw bar 8 is adjustably mounted at its forward end in the channeled retainer portion 6 by means of a pin 9 passing through one of the series of openings 10. The forward end of the draw bar is provided with a hitching member 11. The rear of the draw bar consists of a pair of diverging portions 12 which are attached to uprights 13 secured to leaves 14 at their bottom ends.

The attachments are connected between the rear ends of the portions 12 of the draw bar 8 and the upright 13 is formed by the transversely extending rod 15 so as to form a pivot. A lever 16 is pivoted on this cross rod 15 and is also pivoted to the portion 7 of the stem 5. An arcuate rod 17 is provided on the portion 7 and cooperates with a pawl of conventional type mounted on the lever as at 18.

A pulverizer box indicated by the letter B, includes a top formed of two plate sections 19 attached to sides 20 which are pivoted to the leaves 14 as at 21. Cutter blades 22 are pivotally engaged with the forward end of the sides 20 and a plow nose 23 is supported by the stem 5 and the bracket 24 which also supports the forward edge of the blades 22. Handles 25 are engaged with bracket 24 by a fork 26 as are also the ends of a guard 27 which has its intermediate portion engaged as at 28 to the channel retainer 6. As is shown in Fig. 1, this guard 27 is in the form of a loop and prevents clogging of the apparatus by weeds and the like.

A depth governor 29 is mounted on the channel retainer so as to be adjustable as at 30.

From the above it will be seen that the width of the entire cultivator may be varied by operation of the lever 16. Thus by swinging the lever 16 forwardly, the length of the cultivator is made greater since both stems 5 and bar 8 are moved forwardly pivoting on the lever 16 and pivoting in relation to each other and sliding in relation to each other at the pin 9. This draws the leaves 14 rearwardly, thereby swinging the sides 20 toward each other and sliding the top sections 19 over each other so that the width of the apparatus is made smaller. By rocking the lever rearwardly, just the opposite occurs, namely, the length of the apparatus is slightly shortened and the width thereof made greater.

The present embodiment of the invention, of course, has been described merely by way of example and it is apparent that numerous changes in the details of construction, and in the combination and arrangement of parts will be resorted to without departing from the spirit or scope of the invention as hereinafter claimed, or sacrificing any of its advantages.

Having thus described my invention, what I claim as new is:—

1. A cultivator of the class described including a frame, a pair of blades pivoted to the frame, a pulverizer box including a pair of hingedly associated sections, the free ends of the sections being pivotally engaged with the free ends of the blades, and means for swinging the pulverizer box longitudinally of the frame so as to swing the sections thereof relatively to the blades for changing the width of the cultivator.

2. In combination, a frame, a lever pivoted intermediate its ends to the frame, a pair of leaves supported on the end of the lever, a pulverizer box formed in sections hinged to the leaves, blades mounted on the frame and pivotally engaged with the sections of the pulverizer box.

3. In combination, a frame, a lever pivoted intermediate its ends to the frame, a pair of leaves supported on the end of the lever, a pulverizer box formed in sections hinged to the leaves, blades mounted on the frame and pivotally engaged with the sections of the pulverizer box, a loop guard mounted at the forward end of the machine for preventing weeds from clogging the same.

In testimony whereof I affix my signature.

OLLIE M. MARTIN